United States Patent [19]

Funk et al.

[11] 4,017,270
[45] Apr. 12, 1977

[54] COAL GASIFICATION PROCESS WITH IMPROVED PROCEDURES FOR CONTINUOUSLY FEEDING LUMP COAL UNDER PRESSURE

[75] Inventors: Erwin D. Funk; Michael I. Sherman, both of Glens Falls, N.Y.

[73] Assignee: Kamyr, Inc., Glens Falls, N.Y.

[22] Filed: Jan. 20, 1975

[21] Appl. No.: 542,407

Related U.S. Application Data

[63] Continuation-in-part of Ser. No. 438,273, Jan. 31, 1974, abandoned.

[30] Foreign Application Priority Data

July 29, 1974 South Africa .................... 74/4815

[52] U.S. Cl. .............................. 48/197 R; 48/86 R; 48/210; 48/DIG. 7; 214/17 B; 214/17 CC; 302/66

[51] Int. Cl.² ......................... C10J 3/06; C10J 3/30

[58] Field of Search ................. 48/197 R, 202, 203, 48/206, 210, 86 R, 86 A, 63, 73, 76, 77, 87, 89, 99, 101, DIG. 3, DIG. 4, DIG. 7; 222/194; 162/246, 237; 214/37, 359, 17 CC, 17 R, 17 B; 302/11, 14, 15, 16, 66; 209/2, 11, 12, 234, 258, 256, 268; 210/297, 400; 110/101 R, 31, 75

[56] References Cited

UNITED STATES PATENTS

| 2,761,824 | 9/1956 | Eastman et al. | 48/210 |
|---|---|---|---|
| 2,901,149 | 8/1959 | Richter | 222/194 |
| 2,914,223 | 11/1959 | Richter | 222/194 |
| 3,411,986 | 11/1968 | Buchberger et al. | 162/246 |
| 3,429,773 | 2/1969 | Richter | 162/246 |
| 3,633,797 | 1/1972 | Graff | 222/194 |
| 3,950,146 | 4/1976 | Funk | 48/197 R X |
| 3,950,147 | 4/1976 | Funk et al. | 48/197 R X |

FOREIGN PATENTS OR APPLICATIONS

| 174,094 | 5/1959 | Sweden |
|---|---|---|
| 324,949 | 6/1970 | Sweden |

OTHER PUBLICATIONS

"The Manufacture of Pulp and Paper", vol. III, section 4, pp. 62, 63, Lee et al., McGraw–Hill, 1937.
Kamyr Continuous Cooking Installations, bulletin No. 200F.

*Primary Examiner*—S. Leon Bashore
*Assistant Examiner*—Peter F. Kratz
*Attorney, Agent, or Firm*—Cushman, Darby & Cushman

[57] ABSTRACT

A gasification process in which gasification of lump size gas producing material, such as coal, is carried out under high pressure on a fixed-bed principle with a continuous feed of coal particles thereto, the continuous feed being accomplished by feeding coal of an appropriate particle size range into a volume of liquid within a first confinement path through a free surface thereof exposed to atmospheric conditions, collecting successive incremental volumes of particles and entrained liquid and transferring them into a liquid within a second circuitous confinement path maintained under pressure by virtue of the exposure of the free surface of a volume thereof with the gasification pressure conditions, conveying the particles of the incremental volumes communicated with the second path through a pumping action upstream of the particle communication therewith, collecting the particles in the volume and moving them upwardly through the free surface thereof into the gasification zone.

12 Claims, 5 Drawing Figures

COAL GASIFICATION PROCESS WITH IMPROVED PROCEDURES FOR CONTINUOUSLY FEEDING LUMP COAL UNDER PRESSURE

This application is a continuation-in-part of our copending application Ser. No. 438,273, filed Jan. 31, 1974 and now abandoned.

This invention relates to the production of gas from gas-producing material, such as coil, oil shale, lignite, etc. and more particularly to a gasification process involving the continuous feeding of lump sized gas producing particles into a high pressure gasification zone or vessel.

A report prepared for the U.S. Interior Department Office of Coal Research in December, 1972, entitled "Evaluation of Coal-Gasification Technology", concluded that the natural gas supply situation at that time was sufficiently critical to justify the greatest effort to develop as quickly as possible the best and the most economic methods of producing supplemental pipelinequality gas from coal. The ad hoc industrial panel which prepared the report noted that at the time of the report the Lurgi fixed bed coal gasifier constituted the only coal-gasification process ready for commercial application. A schematic flow diagram of the Lurgi fixed-bed gasifier is shown in FIG. 3–69, page 3/106 of the Gas Engineer's Handbook, published by Industrial Press, Inc., 1969 edition. For purposes of background, chapter 9 of the Gas Engineer's Handbook, pages 3/100 to 3/111 are hereby incorporated by reference into the present specification, together with the aforesaid coal-gasification evaluation.

The analysis of the Lurgi fixed bed process made by the ad hoc industrial committee, is set forth on page 37 of the report in the following language:

"The settling-bed gasifier (Lurgi) process is based on an intermittent method of feeding the coal and removing the ash through lock hoppers with gasification taking place in a moving bed of lump coal. The problems of coal feeding plus the need to stir the bed with a water-cooled rotating arm or some similar stirring device limits the individual gasifier units to relatively small size and low through-put. In combustion processes in the United States, these techniques were discarded 30 to 50 years ago, in favor of the use of pulverized coil at high combustion rates in large equipment. Large savings in capital investment and operating costs should be possible if these same methods can be adapted to high-pressure coal gasification. It is for this reason that the panel recommends the broad approach to testing a number of processes to determine as quickly as possible the one or two that offer the best technological and economic advantages for the gasification plants."

Thus, all of the other gasification processes evaluated by the panel in the evaluation involve the feeding of pulverized coal and the utilization of pulverized coal in the gasification. In at least one of these processes, pulverized coal is fed as a slurry. However, in the evaluation of this process it is noted as a disadvantage that the advantages of slurry feed are in some measure counterbalanced by the preparation of the slurry, the recovery of the liquid used in the slurry, specifically oil, and the heat necessary in the recovery step.

An object of the present invention is the provision of a gasification process of the fixed bed type which involves the continuous feeding of lump size gas producing particles such as coal into a high pressure gasification zone or vessel. By the present process it becomes feasible to utilize the commercial experience thusfar gained in the operation of fixed bed gasification and to eliminate the disadvantages inherent therein as noted by the ad hoc panel to achieve a solution to the gasification technology problem without the necessity of carrying forward the pulverized coal processes to a point of commercial utility. In accordance with the principles of the present invention, this objective is obtained by first mixing the lump coal feed with a liquid to form a slurry and handling the feed in slurry form. While slurry feeding of pulverized coal is known, in accordance with the principles of the present invention the very disadvantages which the panel found in slurrying pulverized coal are eliminated in the present process. Thus, applicants have found that the energy requirements to effect separation of pulverized coal from the liquid medium are all importantly involved in affecting separation of the liquid which adheres to the surface of the particles rather than the free liquid which exists in the space between particles. Applicants have found that these energy requirements are materially reduced when the coal is in lump form rather than in pulverized form, since the surface to volume ratio of the solids is substantially less. In the present system, the particles are separated from the main body of liquid filling the spaces between the particles by simply moving the particles upwardly through a free surface of the liquid which is in communication with the pressure conditions within the gasification zone or vessel inlet, which free liquid surface provides an effective seal. The upper movement can be conveniently performed by the turning of a simple screw conveyor. The water or other liquid which adheres to the surface of the particles is removed through the application of heat within the gasification zone or vessel, but since there is relatively little surface area per volume of solid, as compared with the exceedingly large surface area per solid volume with pulverized coal, the heat requirements to effect separation of the surface water do not present a significant energy loss, as is the case where pulverized coal is slurried. Moreover, with the present system the energy required to effect pulverization is likewise saved.

In accordance with the present invention it is not just the fact that a slurry is used, nor is just the fact that the coal particles are ultimately fed into the pressure environment by movement upwardly through a free surface of the liquid in communication with the pressure environment. The successful utilization of a continuous feed of lump coal into a pressure environment in accordance with the principles of the present invention requires, in addition, the pumping of the slurry in such a way that the pump acts only on the liquid component. This is accomplished in the present invention by providing a low-pressure liquid confinement path which likewise contains a volume having a free surface in communication with pressure conditions below those within the inlet of the gasifier. This pressure condition is preferably atmospheric permitting the simple feeding of the coal particles into the low-pressure liquid by a gravity movement downward through the free surface. With the particles entrained in the liquid in the low-pressure path, successive incremental volumes of particles and entraining liquid are removed from communication with the first path and communicated with the second path at a position between the pumping position and the feeding position into the gasifier, as aforesaid.

The pump in the second circuitous high-pressure path of the present system performs the primary function of circulation and does not have to perform the function of pressurizing the liquid and particles from an atmospheric pressure to the pressure of the gasifier inlet as do the pumps of the prior art pulverized surry feeds. The pressure of the liquid in the second path of the present invention is maintained, as aforesaid, by communicating the gasifier inlet pressure with the free surface in the path. The pump is provided, as previously indicated, primarily for the purpose of effecting circulation and hence particle conveyance.

These and other objects of the present invention will become more apparent during the course of the following detailed description and appended claims.

The invention may best be understood with reference to the accompanying drawings wherein an illustrative embodiment is shown.

Figure 1:
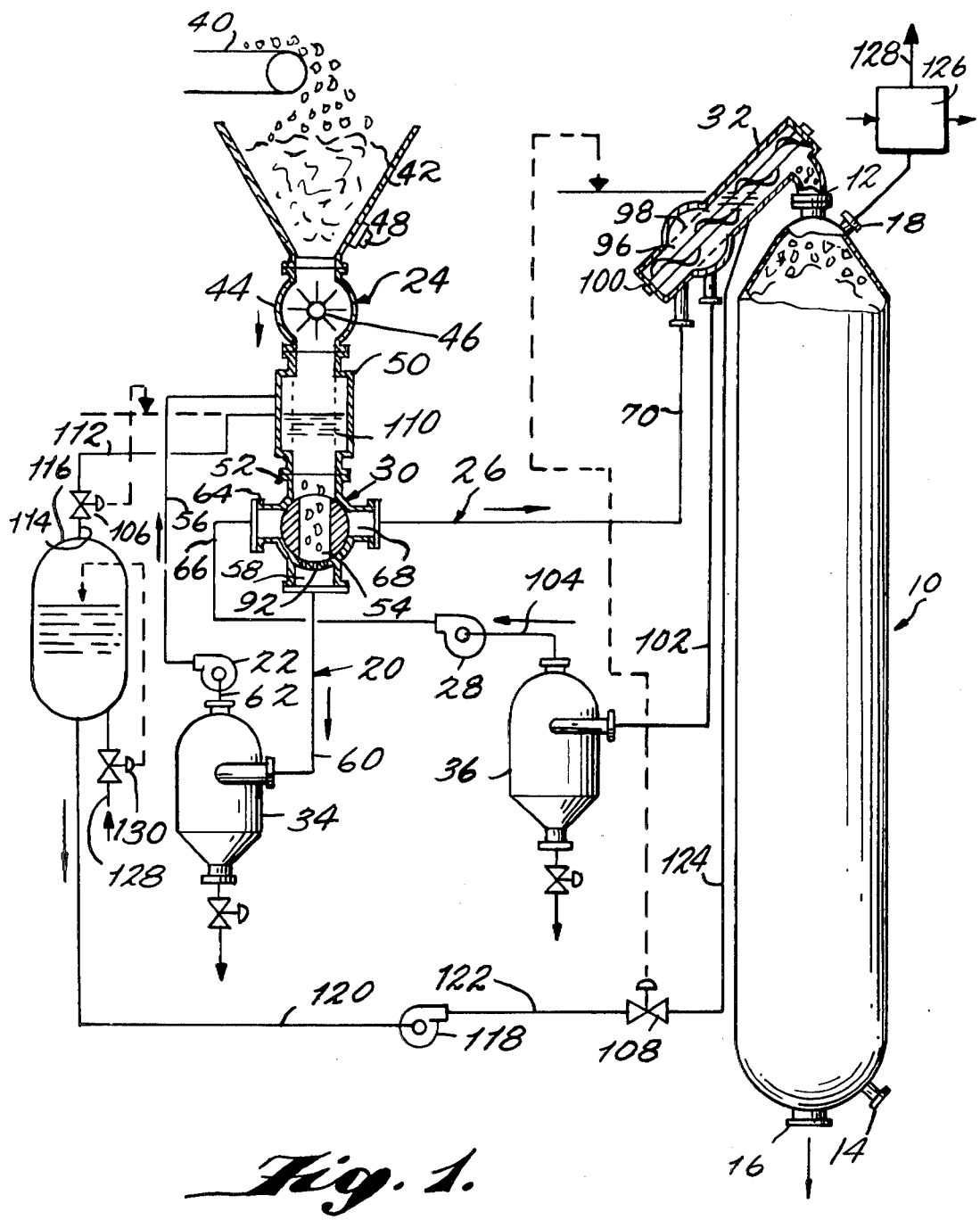
FIG. 1 is a schematic flow diagram illustrating the procedural steps of the present method and the apparatus of the present invention for carrying out the procedural steps of the method.

Referring now more particularly to the drawings, there is shown in FIG. 1 a schematic flow diagram which illustrates the principles of the present method for continuously feeding coal to a continuously operable coal gasifier of the pressurized fixed bed type. In the drawings, the coal gasifier vessel is indicated at 10, and as previously stated, the gasifier is of conventional fixed bed continuous type having an inlet pressure of the order of 300 psi and above communicating with an inlet 12 at the top of the vessel into which coal is fed in accordance with the principles of the present invention. Heated gas for effecting the conversion of the coal to gas is supplied to the gasifier vessel 10 through an inlet 14 adjacent the bottom of the vessel. The ashes or solid coal particulate material residue formed in the gasifier vessel 10 are discharged through a bottom outlet 16. The gases produced within the gasifier vessel 10 are continuously removed through a gas outlet 18 adjacent the top of the vessel. It will be understood that the exact construction and operation of the gasifier 10 may be of any conventional design which is of the type in which the gasification process is carried on continuously under pressure in such a way that fine particles of coal (e.g., approximately ⅛ inch nominal diameter and below) within the gasifier vessel 10 will detrimentally affect the process.

The present method of feeding coal, oil shale, or gas producing material to the gasifier vessel 10 embodies the establishment of a continuous flow of liquid along a first flow path, generally at 20 in FIG. 1. The liquid may be of any suitable composition such as water or the like, a preferred composition being oil and tars as will be explained in more detail hereinafter. As shown, the first flow path 20 is made circuitous by providing a pump 22 at a pumping position within the path, which pump serves to establish and maintain the flow in the circuitous path. At a coal feeding position downstream from the pumping position of the pump 22 within the path 20, a supply of coal particles of a predetermined size range (e.g. approximately ¼ inch nominal diameter to approximately 2 inches nominal diameter) is introduced into the liquid. The just-mentioned exemplary lower and upper limits of the preferred size range are approximations and subject to variation particularly with respect to the approximate upper limit which may extend substantially beyond the exemplary approximate 2 inches figure given. Variation downwardly of the lower limit is more critical in that it should not extend to a value which includes substantial particles of a size which detrimentally affect the gasification process, as aforesaid.

The size range is primarily determined by the needs of the gasification process itself, the feeding system of the present invention being capable of handling any size particle required. Viewed in terms of the characteristics of the feeding system alone, it is desirable to increase the lower limit to increase the surface to volume ratio of the particles to thereby decrease the heat energy required to remove adhered surface liquid as aforesaid, and to decrease the upper limit to decrease the effects of wear on the equipment.

The apparatus for accomplishing the introduction of the coal to the path at the feedng position is illustrated generally at 24. The coal introduced into the liquid at the feeding position is entrained and flows with the liquid downstream along the first flow path 20 to a transfer position where successive volumes of coal particles entrained in liquid are removed from communication with the first flow path while liquid with coal particles smaller than the aforementioned predetermined size range are allowed to continue to flow along the first flow path.

The present method also embodies the establishment of a continuous flow of liquid along a second flow path at an energy level in excess of the energy level of the first flow path. The high energy level flow path is generally indicated at 26 in FIG. 1. As shown, the second flow path 26 is made circuitous by providing a pump 28 at a pumping position within the path, which pump serves to establish and maintain the flow in the circuitous path. At a transfer position within the second flow path which is downstream from the pumping position thereof, the successive volumes of coal particles and entrained liquid removed from communication with the first flow path are communicated with the second flow path. The procedures whereby successive volumes of coal particles entrained in liquid are removed from communication with the liquid in the first flow path and communicated with the liquid in the second higher energy level flow path are accomplished by a single coal transferring or sluicing apparatus, generally indicated at 30 in the drawings. The apparatus 30 is preferably constructed in accordance with the teachings of Swedish patents 174,094 and 324,949, the disclosures of which are hereby incorporated by reference into the present specification.

At a discharge position within the second flow path downstream from the transfer position therein, the liquid and entrained coal particles are confined within a volume in such a way as to present a free liquid surface spaced from the gasifier inlet 12 which is in communication with the gas inlet pressure of the gasifier vessel 10 while the liquid and coal particles less than the predetermined size range are allowed to continue to flow downstream of the discharge position. The coal particles in the confined volume are substantially continuously moved upwardly through the free liquid surface and into the inlet of the gasifier vessel 10. The volume confining procedure and the coal movement procedures are accomplished by a mechanical separator apparatus, generally indicated at 32 in the drawings. The apparatus 32 is preferably constructed in accordance with the teachings of U.S. Pat. No. 3,429,773. U.S. Pat. No. 3,843,468 discloses another apparatus which may be utilized and its disclosure, as well as the disclosure of U.S. Pat. No. 3,429,773, are hereby incorporated by reference into the present specification.

The present invention also contemplates the substantially continuous purification of the liquid flowing in the first and second paths having coal particles less than the predetermined size range entrained therein by substantially continuously separating these fine coal particles therefrom. In the schematic arrangement illustrated in FIG. 1 this separation procedure is performed in both paths, although it will be understood that such separation may be accomplished in only one of the paths. In the schematic diagram shown in FIG. 1 the separation in each path is accomplished by centrifugal separation devices, generally indicated at 34 and 36, disposed within the first and second flow paths respectively at fine coal separation positions therein between the transfer position and pumping position of the first path and the discharge position and pumping position of the second path.

The coal measuring and feeding apparatus 24 may be of any construction, the arrangement schematically illustrated in FIG. 1 including a conveyor 40 which serves to convey coal particles of the predetermined size range from a supply (not shown) into the open upper end of a hopper-like receptacle 42, the lower end of which communicates with the open upper end of a housing 44. The housing 44 is of generally cylindrical configuration with its axis disposed horizontally and has a blade rotor or star wheel 46 mounted therein for rotation about an axis concentric with the axis of the housing 44. The star wheel 46 is power driven at a uniform speed to insure a substantially continuous uniform introduction of coal particles into the liquid in the first flow path. If desired, the receptacle 42 may be vibrated, as by a vibrating device 48, in order to insure a constant flow of coal particles therefrom into the star wheel housing 44.

Figure 2:
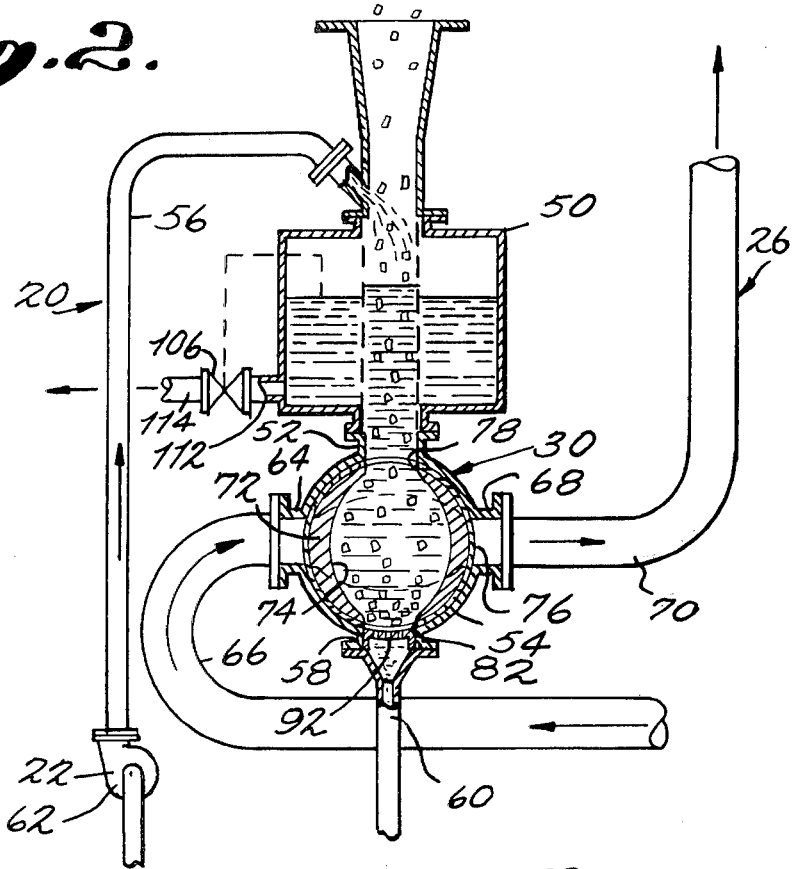
FIG. 2 is an enlarged fragmentary vertical sectional view of the transfer device shown in FIG. 1 with the related equipment connected thereto.

The open lower end of the star wheel housing 44 communicates with the open upper inlet end of a coal feeding chamber 50 which defines the coal feeding position of the first flow path 20. The open lower end of the coal feeding chamber 50 communicates directly with an upper inlet end 52 of a housing 54 of the transmission apparatus 30. The coal feeding chamber 50 receives liquid in the first flow path 20 from the pump 22 by means of a conduit 56 which empties therein adjacent the open upper end thereof, as best shown in FIG. 2. The liquid and coal fines flowing from an open lower end 58 of the sluicing apparatus 30 along the first flow path 20 are directed to the centrifugal separator 34, as by a conduit 60. Finally, the purified liquid from the separator 34 completes the circuitous flow along the first flow path 20 by being directed to the suction side of the pump 22, as by a conduit 62.

Figure 3:
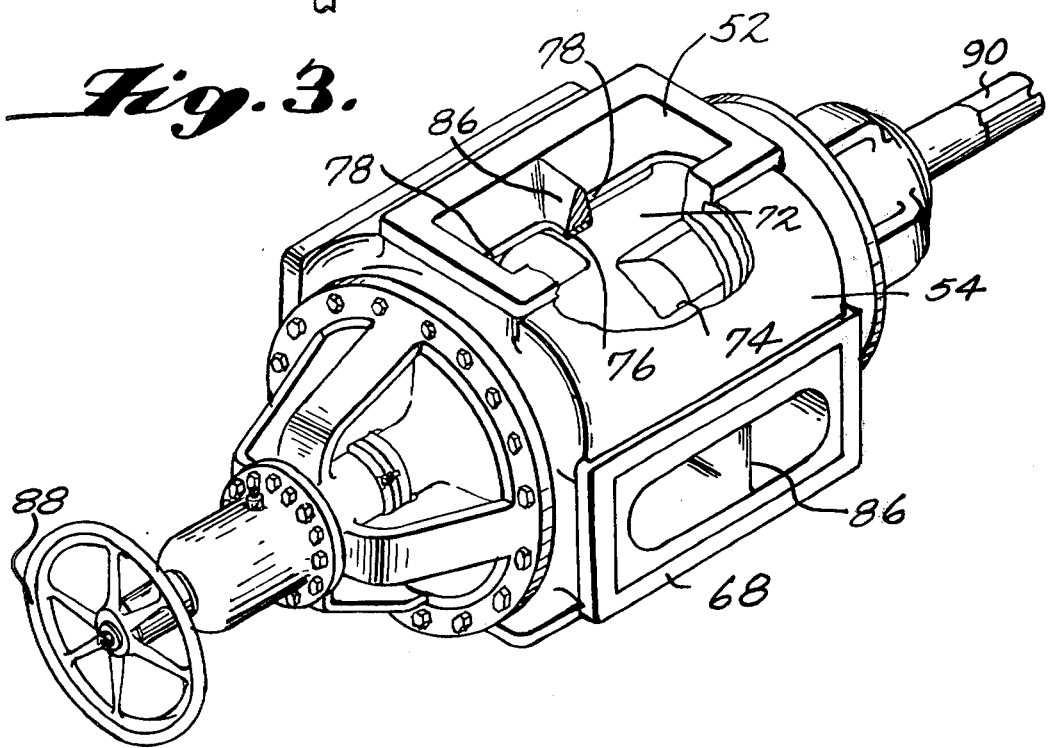
FIG. 3 is a perspective view of the transfer device.
Figure 4:
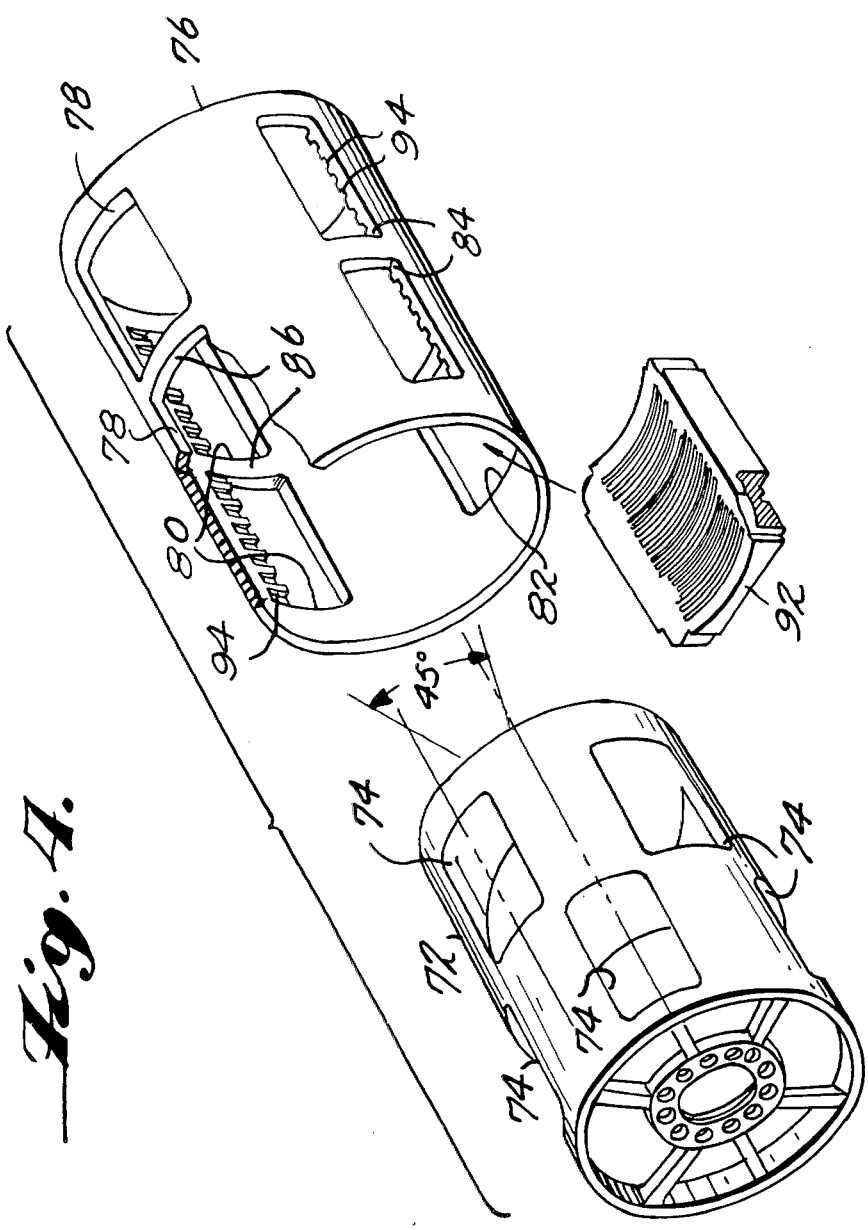
FIG. 4 is an exploded perspective view illustrating certain parts of the transfer device shown in FIG. 3.

The housing 54 of the transmission device 30 also includes an inlet 64 which receives high energy level liquid flowing in the second flow path 26 coming from the pump 28, as by a conduit 66, and an outlet 68, which discharges into a conduit 70 leading to the mechanical separating apparatus 32. Transmission device 30 is shown in solid lines in FIG. 2 in communicating relation with the first flow path 20, the communication with the second flow path 26 being shown in dotted lines. As best shown in FIGS. 3 and 44, the transmission device 30 includes a pocketed wheel 72 containing two rows of diametrically through going pockets 74, each row containing two through going pockets perpendicular to each other presenting four open ports equally spaced around the periphery of the wheel for each row. The two rows of pockets are parallel, one row being 45 degrees displaced peripherally from its adjacent row as is shown in FIG. 4. The pocketed wheel 72 is encased by housing 54 and mounted for rotation within a housing liner 76. As best shown in FIG. 3, the liner 76 includes four ports, 78, 80, 82 and 84, equally spaced around the periphery of the housng which register respectively with inlet 52, inlet 64, outlet 58 and outlet 68. Each port is more than twice as wide as the sum of two pockets 74 in the pocketed wheel and a divider 86 is located midway in each housing port to separate the same into two parallel ports, as clearly depicted in FIGS. 3 and 4.

The pocketed wheel 72 may be either cylindrical or tapered; illustration of such being shown in FIGS. 3 and 4 as tapered with wheel diameter increasing in the direction of a clearance adjusting hand wheel 88. Tapering of the wheel 72 provides for adjustment of the clearance between the wheel 72 and housing liner 76; additionally, increase in clearance due to wear can be taken up by turning hand wheel 88 pushing wheel 12 toward a shaft drive end 90 shown in FIG. 3. The pockets 74 through wheel 72, in a row, loop over each other so as to provide passage through the wheel while maintaining inline openings in the wheel around the periphery of the wheel. While looping, the pocket becomes narrower but wider, such widening being shown in FIG. 2; the narrowing being necessary to accomplish the looping over of passages and the widening being provided to maintain a nearly constant pocket cross-sectional area for liquid and coal particle flow.

Coal particles entering the transmission device 30 with liquid through inlet 52 are drawn by gravity and liquid motion provided by liquid pump 22 through ports 78 and 82. A screen 92 is disposed within each port 82. Each screen has screen openings or slots of a size permitting water and fine coal particles of a size (e.g., approximately ⅛ inch nominal diameter) which detrimentally affect the gasification procedure as aforesaid to pass therethrough and block passage of larger particles including those of the predetermined size range which are thus held in the communicating wheel pocket 74. As the filled pocket 74 rotates and begins to approach a position nearly perpendicular to its filling position, liquid in the second flow path 26 from pump 28 is forced through conduit 66 and port 80 into the pocket causing discharging of coal particles from the pocket through port 84 into conduit 70. Before the pocket again rotates to the filling position all coal particles are emptied into conduit 70 leaving only liquid in the pocket.

The liquid left in the pocket, which is liquid flowing within the second flow path, is inherently (1) removed from the second flow path before the pocket again rotates to the filling position and (2) communicated with the liquid flowing within the first flow path when the pocket again rotates to the filling position. Thus, for each successive volume of liquid and entrained coal particles removed from the first flow path and communicated with the second flow path, there is a corresponding volume of liquid removed from the second flow path and communicated with the first flow path. A continuous equal volumetric transfer or exchange between the two flow paths is therefore inherently accomplished, which equal volumetric exchange likewise inherently results in a net flow of coal particles from the first flow path to the second flow path and an equal net flow of liquid from the second flow path to the first flow path The pocketed wheel 72 rotation is continuous but the filling and emptying of pockets in a single row of pockets is intermittent. Since the adjacent parallel row of pockets displaced 45 degrees peripherally, is also intermittent filling and discharging, the sum of these two intermittent filling and discharging rows of pockets is continuous. The continuous operation is an effect of the peripheral displacement of the two parallel rows of pockets, such displacement being shown in FIG. 4, for as a pocket is closing to a housing inlet port a pocket is opening to the same port thus always maintaining a constant open cross section through the first flow path filling ports 78 and 82 and the second flow path discharging ports 80 and 84 making the filling and discharging circulation systems continuous.

The transmission device 30 is uniquely characterized by several important internal features. The first of these is the ability to transfer coal particles from one flow path to another flow path at higher pressure without the need for positive sealing surfaces. According to the present invention the rotating pocketed wheel 72 need not come into intimate contact with the housing liner 76 but may present a clearance therewith. Since ports 78 and 82 are at a lower pressure than ports 80 and 84 a leakage occurs in the form of liquid flow from ports 80 and 84 to ports 78 and 82 through the clearance. The liquid flow through the clearance is maintained small by maintaining the clearance narrow. The small liquid flow provides a lubrication and cleaning function which prevents binding of rotating wheel 72 with the housng liner 76. Secondly, another unique feature of the transmission device 30 is the screening out of fine material through screen. During filling of a pocket 74 in the rotating wheel 72, fine coal particles are drawn through the peripheral slots in the screen 92. The slots are sized to remove particles below the predetermined size range, as aforesaid. The constructional form of the transmission device 30 is such that self cleaning of the screen 92 is provided, such cleaning being performed by the edge of the rotary wheel pocket as the edge passes over the slots. Thirdly, the liner 76 may be provided with one or more grooves 94 adjacent the port openings 80 and 84, as shown in FIG. 4. The grooves 94 are formed with a peripheral dimension which is greater than the dimension measured in the radial direction, so that a liquid flow from pump 28 at high pressure into the pocket openings 80 and 84 is exposed to strong choking action. Consequently, shocks and vibrations originating on pocket to port opening are milder reducing the tendency of coal particles to break. Lastly, the liquid used as a conveying medium tends to provide two means for preventing cutting of coal particles when the rotating wheel pocket edge closes housing filling port 78 to the wheel pocket with the wheel 72 rotating at a low rpm, preferably 5 to 10 rpm. The liquid provides some buoyancy to the coal particles since the particles' density is preferably only from 1.2 to 1.4 times greater than that of the liquid. Since the particle density is just slightly greater than the liquid, the pocket edge will tend to push the article away rather than pinch or cut off the particle between the pocket edge and the housing filling port edge. As the pocket being filled closes off to the filling port, the pocket in the parallel row of pockets is approaching full open to the filling port so that the majority of liquid flow is through this pocket carrying all of the particles into this pocket leaving none or nearly none to be pinched off by the closing pocket.

The fluid motion provided by centrifugal pump 28 conveys successive volumes of coal particles and liquid from the device 30 via conduit 70 to the mechanical separator 32. The mechanical separator 32, which may be of any known type, is shown as an inclined screw conveyor 96, surrounded at the lower end by a screen 98, such screw and screen being encased by a housing 100. The mechanical separator 32 may be of vertical design rather than as shown inclined. A 30° to 60° inclination of the mechanical separator 32 has been found to be optimal. Coal particles and liquid conveyed by conduit 70 enter the lower end of housing 100 and begin movement toward the gasifier 10 inlet port 12. Liquid which carried the coal particles to the housing 100 is allowed to continue movement along the second flow path through screen 98 and conduit 102. The screen 98 is sized to allow coal fines (e.g., approximately ⅛ inch nominal diameter and less) to pass therethrough with the liquid. It will be noted that the liquid level in the housing 100 is maintained constant. The screw conveyor 96 serves to continuously move the coal particles in this volume up the inclined housing through the surface of the liquid level and then by gravity through gasifier inlet port 12 into gasifier 10. As the coal particles pass through the liquid level interface, liquid is mostly drained from the coal particles, the liquid level creating a seal to prevent gas leakage from the gasifier 10 through the mechanical separator 32. The liquid and any fine coal particles are conveyed through conduit 102 to centrifugal separator 36 where coal fines are removed from the liquid by centrifugal forces providing purified liquid to centrifugal pump 28 through conduit 104. From centrifugal pump 28, the liquid is conveyed by conduit 66 to the inlet connection or port 64 of the sluicing device 30 completing the liquid circulation path.

Liquid levels in the feed chamber 50 and mechanical separator 32 are maintained by liquid level control valves 106 and 108 respectively. The liquid level in feed chamber 50 presents a free surface which is exposed to low pressure conditions (e.g., atmosphere) and the liquid defining the free surface forms a part of the liquid within the first flow part 20. The liquid level in separator 32 presents a free surface which is exposed to the high pressure conditions of the gasifier inlet (e.g., 300 psig) and the liquid defining the free surface forms a part of the liquid within the second flow path 26. Viewed in terms of the movement of liquid into and out of each flow path, other than through the level control valves 106 and 108, it will be understood that the liquid level of the feed chamber 50 will tend to rise while the liquid level in the separator 32 tends to fall. Liquid enters the first flow path 20 and leaves the second flow path 26 by virtue of the aforesaid net liquid flow resulting from the volumetric exchange inherently performed by the sluicing apparatus 30, and by virtue of the aforesaid high pressure to low pressure liquid leakage within the sluicing apparatus 30. In addition to the above net liquid flow between the paths, liquid is lost from each path by adherence to the fine coal particles discharged from the separators 34 and 36 and from the second flow path by adherence to the coal particles discharged into the gasifier inlet. Liquid level control valve 106 opens on level sensing of a rise of the liquid level in feed chamber 50 to allow liquid within the first flowpath to flow therefrom through an annular screen 110 therein and suitable conduits 112 and 114 in series with valve 106 to a control tank 116. A centrifugal pump 118 drains liquid, via conduit 120, from level control tank 116 and forces liquid, via conduit 122, to level control valve 108. Level control valve 108 opens on level sensing of a fall of the liquid level within housing 100 to supply liquid to the second flowpath 26, via conduit 124. Since liquid is lost through centrifugal separators 34 and 36 and some amounts to the gasifier 10 by adherence to the coal, makeup liquid must be supplied to the liquid level control tank 116.

A significant overall processing advantage is obtained when the liquid utilized is oil and light tars since these are subject to processing within the gasifier and of recovery therefrom for use at least as part of the make-up liquid. Such recovery is schematically illustrated in FIG. 1 where the hot gases (containing entrained oil and light tar vapors) flowing through gasifier outlet 18 are subsequently subjected to a conventional washing treatment, as indicated at 126, to purify the gas and obtain an oil and light tar fraction at 128. This oil and light tar fraction 128 is then fed to the tank 116 via a level sensing valve 130. This preferred arrangement is not only advantageous from a standpoint of material efficiency, but heat efficiency as well.

Figure 5:
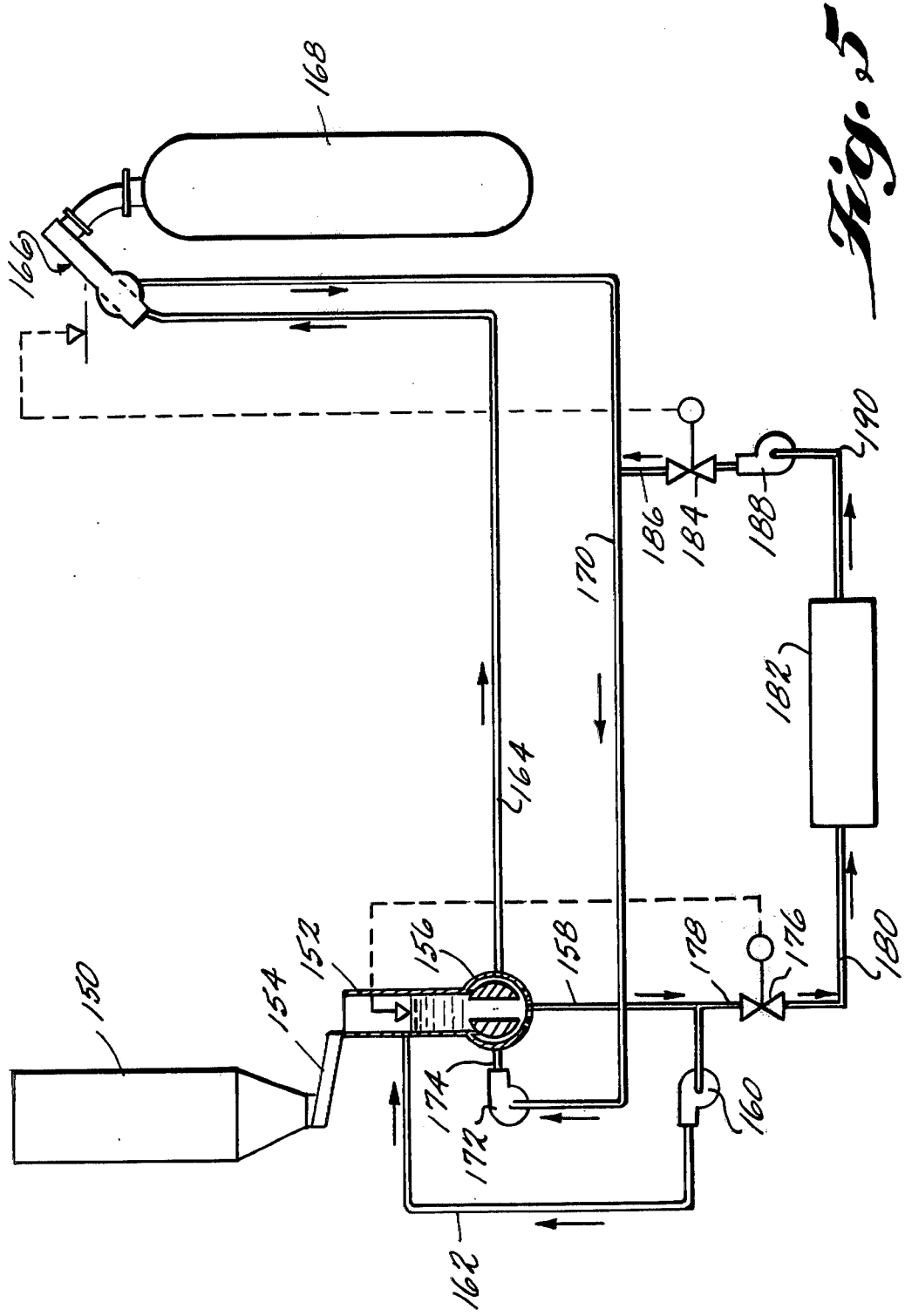
FIG. 5 is a schematic flow diagram illustrating a simplified version of the procedural steps of the method and an apparatus embodying the principles of the present invention for carrying out the procedural steps of the method.

Referring now more particularly to FIG. 5, there is shown therein a schematic flow diagram of a simplified version of the present process and apparatus. In the system of FIG. 5, coal within the aforesaid particle size range is fed from a supply silo or bunker 150 directly into the open upper end of a chute 152 by an appropriate feeding device 154, which, as shown, is in the form of a vibrating conveyor. Other known feeding devices may be utilized such as a reciprocating apron feeder. The vibrating conveyor is preferred over the device embodying the star wheel 46 previously described since the latter inherently causes the production of fines as the wheel rubs against the coal.

The utilization of the simple cylindrical chute 152 is preferred over the chamber 50 having a cylindrical screen 110 therein previously described. The screen 110 was provided in conjunction with the level control tank 116 and centrifugal separator 34. Since the level control tank 116 and separator 34 are eliminated in the system of FIG. 5 as will become more apparent hereinafter, the cost of the screen 110 can be eliminated along with the operating problems due to blockage which may occur.

The chute 152 forms a part of a first low pressure confinement path within a volume of the liquid, in this case preferably water, is maintained with a free surface. As before the chute 152 extends to a transferring or sluicing apparatus 156 of a construction corresponding to the apparatus 30 previously described. From the transferring apparatus 156, the firt path is defined by a first conduit 158 leading to a circulating pump 160 and a second conduit 162 leading from the pump 160 back to the chute 152.

The transferring apparatus 156, as before, is also disposed within a second circuitous high pressure path defined by a conduit 164 leadng therefrom to a separating apparatus 166 of a construction corresponding to the apparatus 32 previously described, correspondingly connected with a gasifier 168. The second circuitous high pressure path is completed by a conduit 170 leading from the separating apparatus 166 to a circulating pump 172 and a conduit 174 leading from the pump 172 back to the transferring apparatus 156.

The supply coal of approximate particle size range is fed directly into atmospheric pressure chute 152 from silo or bunker 150 by the vibrating conveyor 154, falling by gravity into the volume of water contained therein through the free surface thereof. The rate of coal feed is controlled by the rate in which coal is used in the gasifier 168. The high energy liquid flow path is motivated by pump 172 to sluice coal from sluicer 156 to a separator 166. Separator 166 lifts coal from the high energy liquid volume therein through a free liquid surface thereof. The low energy liquid path is motivated by the pump 160. Coal is entrained in this path through a free liquid surface in chute 152 as aforesaid. The sluicer 156 transfers coal from the low energy path to the high energy path.

Since coal entering the pockets of sluicer apparatus 156 displaces liquid from the high energy path, the low energy path gains liquid and the high energy path loses liquid. Additionally, leakage in the apparatus 156 adds to this gain and loss respectively. The gain of liquid to the low energy path results in a rise in liquid level in chute 152. This rise in level is prevented by the opening of a level control valve 176 within a conduit 178 leading from the conduit 158, to cause the excess liquid to be transmitted away to an independent fines separation facility via conduit 180. A pump may be included in conduit 180 if the separation facility is too far or elevated preventing gravity flow. The independent fines removal system may be of any construction and location such as at the coal cleaning facility for the supply coal or a place of use for the fines such as a boiler. For illustrative purposes, the fines removal system is shown in the form of a thickener 182 which provides a water supply for the water loss from the high pressure path. In the thickner 182 the fine particles are concentrated within a portion of the entraining liquid leaving a remaining quantity of liquid free of fine particles. It will be understood that makeup water for the high pressure path may be provided from any other suitable source, however.

The amount of the makeup water is controlled by a level control valve 184 which maintains the free liquid level in separator 166 at a constant level. The makeup liquid is supplied to conduit 170 through a conduit 186 containing valve 184 and boosted to the pressure of the high energy liquid by a pump 188 having a suction conduit 190 leading from the thickener 182. Since there is always an exchange of liquid from the high energy path and a subsequent removal of liquid from the low energy path to be replaced by clean liquid in the high energy path, there is a resultant flow of fines with this liquid exchange. All fines are removed by passage through the screen in sluicing apparatus 156. A portion of these fines is removed during the filling of the pockets of the apparatus 156. Those fines that remain will be drawn through the screen of separator 166 and recirculated to the apparatus 156. Just prior to filling with coal, the pockets of apparatus 156 contain liquid that was previously in the high energy liquid path. This liquid would contain fines that passed through the screen of the separator 166. The liquid with entrained fines is drawn through the sluicer screen during the pocket filling. The net removal of liquid with fines and subsequent replenishment with clear liquid results in maintaining the liquid in the system at a low fines concentration level and preventing fines discharge into the gasifier.

It will be understood that while the present invention has been disclosed as a total gasification process in which the solid particle discharge from the gasification vessel is ash, the present invention also comtemplates processes where the production of gas may be regarded as a byproduct, as for example, decarbonization processes of all known varieties including specifically coking processes.

It thus will be seen that the object of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims:

We claim:

1. A process of producing gas from gas producing material, such as coal, having a predetermined particle size range, such as approximately ¼ inch nominal diameter to approximately 2 inches nominal diameter, by continuously feeding a supply of such particles into inlet means of gasifier means under a predetermined elevated inlet pressure where the particles are continuously heated under pressure to produce gas by procedures which are detrimentally affected by the presence of substantial amounts of fine particles of a size less than said predetermined size range, the improvement wherein said continuous feeding comprises the steps of:

confining a liquid within a first path including a first volume defining a first free surface exposed to pressure conditions which are low with respect to the elevated inlet pressure of said gasifier means, introducing a supply of particles of said size range into the liquid within said first confined path downwardly through the free surface thereof, confining liquid within a second path which is circuitous and includes a second volume defining a second free surface communicating with the elevated pressure of the inlet means of said gasifier means, continuously circulating the liquid within said second circuitous path by pumping the same at a pumping position spaced from said second volume, removing successive incremental volumes of liquid and entrained particles within said first path and communicating said successive removed volumes of liquid and entrained particles with the liquid flowing in said second path at a position between said pumping position and said second volume, collecting the particles of said size range within said second volume, and moving the collected particles upwardly through said second free surface and into the inlet means of said gasifier means.

2. A process as defined in claim 1 wherein for each successive incremental volume of liquid and entrained particles removed from said first path and communicated with said second path a corresponding incremental volume of liquid is removed from said second path at a position between said pumping position and said second volume and communicated with the liquid in said first path so that a volumetric exchange between said paths takes place resulting in a net flow of particles within said size range from said first path to said second path and a net flow of liquid from said second path to said first path.

3. A process as defined in claim 2 wherein said second free surface is maintained at a substantially constant level by pumping sufficient liquid from a liquid supply into said second path to replenish the aforesaid net flow of liquid from said second path to said first path and other liquid losses from said second path.

4. A process as defined in claim 3 wherein said first free surface is maintained at a substantially constant level by directing sufficient liquid from said first path to maintain such level.

5. A process as defined in claim 4 wherein the liquid directed from said first path to maintain said first free surface level is treated to provide a quantity of liquid free of fine particles and utilizing said quantity of liquid as the liquid supply to replenish the liquid losses from said second path.

6. A process as defined in claim 5 wherein the treatment which provides such quantity of liquid comprises collecting the liquid directed from said first path to maintain said first free surface level in a thickener where the fine particles are concentrated within a portion of the entraining liquid leaving a remaining quantity of liquid free of said fine particles.

7. A process as defined in claim 4 wherein said successive incremental volumes are removed from said first path by maintaining a continuous flow of liquid and entrained particles from said first volume into an incremental volume removal position within said first path, blocking the flow of particles within said predetermined size range at said incremental volume removal position while permitting liquid and particles less than said predetermined size range to flow beyond said incremental volume removal position, and successively removing an amount of blocked particles and the liquid entraining the same.

8. A process as defined in claim 7 wherein said continuous flow of liquid and entrained particles from said first volume is maintained by pumping a portion of the liquid flowing beyond said incremental volume removal position back into said first volume.

9. A process as defined in claim 8 wherein the liquid from the liquid supply pumped into said second path is maintained substantially free of fine particles of a size less than said predetermined size range by separating the fine particles from a portion of the liquid utilized.

10. A process as defined in claim 9 wherein the portion of the utilized liquid from which the fine particles are separated is flowing in said first path between said incremental volume removal position and said first volume.

11. A process as defined in claim 2 wherein said successive incremental volumes are removed from said first path by maintaining a continuous flow of liquid and entrained particles from said first volume into an incremental volume removal position within said first path, blocking the flow of particles within said predetermined size range at said incremental volume removal position while permitting liquid and particles less than said perdetermined size range to flow beyond said incremental volume removal position, and successively removing an amount of blocked particles and the liquid entraining the same.

12. A process as defined in claim 11 wherein said continuous flow of liquid and entrained particles from said first volume is maintained by pumping a portion of the liquid flowing beyond and incremental volume removal position back into said first volume.

* * * * *